(12) United States Patent
Scillieri et al.

(10) Patent No.: US 10,613,800 B2
(45) Date of Patent: Apr. 7, 2020

(54) METHODS AND SYSTEMS FOR IMPROVING DISCLOSURE REQUIREMENT COMPLIANCE

(71) Applicant: The Western Union Company, Englewood, CO (US)

(72) Inventors: Anthony Scillieri, Pequannock, NJ (US); Venkateshwarlu Kotagiri, Flushing, NY (US); Denis McCarthy, Killorglin (IE)

(73) Assignee: The Western Union Company, Denver, CO (US)

(*) Notice: Subject to any disclaimer, the term of this patent is extended or adjusted under 35 U.S.C. 154(b) by 182 days.

(21) Appl. No.: 15/934,609

(22) Filed: Mar. 23, 2018

(65) Prior Publication Data

US 2018/0210682 A1 Jul. 26, 2018

Related U.S. Application Data

(63) Continuation of application No. 15/178,108, filed on Jun. 9, 2016, now Pat. No. 9,928,011, which is a continuation of application No. 14/570,037, filed on Dec. 15, 2014, now Pat. No. 9,384,428.

(51) Int. Cl.
*G06F 3/12* (2006.01)
*G06K 15/02* (2006.01)

(52) U.S. Cl.
CPC .......... *G06F 3/1204* (2013.01); *G06F 3/1234* (2013.01); *G06F 3/1268* (2013.01); *G06F 3/1275* (2013.01); *G06K 15/1805* (2013.01)

(58) Field of Classification Search
CPC .... G06F 3/1204; G06F 3/1275; G06F 3/1268; G06F 3/1234; G06K 15/1805
See application file for complete search history.

(56) References Cited

U.S. PATENT DOCUMENTS

| | | | |
|---|---|---|---|
| 6,003,065 A | 12/1999 | Van et al. | |
| 6,222,634 B1 | 4/2001 | Dubbels et al. | |
| 6,603,492 B1 | 8/2003 | Sakaguchi | |
| 6,941,523 B1* | 9/2005 | Mathieson | G06F 3/1204 358/1.15 |
| 8,797,558 B2 | 8/2014 | Oeters et al. | |
| 9,384,428 B1 | 7/2016 | Scilleri et al. | |
| 9,928,011 B2 | 3/2018 | Scillieri et al. | |

(Continued)

OTHER PUBLICATIONS

U.S. Appl. No. 15/178,108, filed Jun. 9, 2016 Non-Final Rejection dated Feb. 22, 2017, all pages.

(Continued)

*Primary Examiner* — Ming Y Hon
(74) *Attorney, Agent, or Firm* — Kilpatrick Townsend & Stockton LLP

(57) ABSTRACT

Systems and methods for bypassing a print dialog box that indicates a print confirmation, a prompt message, or a page preview, by employing a background print applet. The systems and methods may include detecting a print content to be printed by a printer, identifying one or more features of the print content, and determining one or more print settings based on the identified one or more features. The systems and methods may further include initiating the print content to be printed by the printer based on the determined print settings, whereby initiating the print content includes bypassing the print dialog box.

20 Claims, 5 Drawing Sheets

(56) References Cited

U.S. PATENT DOCUMENTS

| | | | |
|---|---|---|---|
| 2003/0142352 A1* | 7/2003 | Matsunaga | G06F 3/1204 358/1.15 |
| 2003/0202010 A1 | 10/2003 | Kerby et al. | |
| 2003/0231336 A1 | 12/2003 | Kim | |
| 2005/0105724 A1 | 5/2005 | Hull et al. | |
| 2005/0137883 A1 | 6/2005 | Nohgawa et al. | |
| 2005/0179926 A1* | 8/2005 | Nishikawa | G06F 3/1205 358/1.13 |
| 2006/0001899 A1 | 1/2006 | Kanno | |
| 2006/0044572 A1 | 3/2006 | Nakayama | |
| 2006/0224449 A1* | 10/2006 | Byerley | G06Q 30/0226 705/14.27 |
| 2007/0242961 A1 | 10/2007 | Mastie et al. | |
| 2008/0204805 A1 | 8/2008 | Ming | |
| 2009/0015847 A1 | 1/2009 | Luo | |
| 2009/0128843 A1* | 5/2009 | Lao | G06F 3/1205 358/1.15 |
| 2009/0231615 A1 | 9/2009 | Itami et al. | |
| 2009/0268229 A1 | 10/2009 | Richardson et al. | |
| 2011/0063658 A1 | 3/2011 | Natori | |
| 2011/0063659 A1 | 3/2011 | Sakura | |
| 2011/0141507 A1 | 6/2011 | Kawaura | |
| 2011/0235108 A1 | 9/2011 | Kato | |
| 2011/0292445 A1 | 12/2011 | Kato | |
| 2012/0092699 A1* | 4/2012 | Moore | H04L 63/1416 358/1.15 |
| 2012/0300249 A1* | 11/2012 | Shustef | G06F 3/1287 358/1.15 |
| 2012/0300258 A1 | 11/2012 | Cong et al. | |
| 2013/0135668 A1* | 5/2013 | Minagawa | G06F 3/1204 358/1.15 |
| 2013/0215464 A1 | 8/2013 | Kubo et al. | |
| 2015/0134367 A1 | 5/2015 | Wittig | |
| 2015/0301773 A1* | 10/2015 | Minagawa | G06F 3/1222 358/1.13 |

OTHER PUBLICATIONS

U.S. Appl. No. 15/178,108, filed Jun. 9, 2016 Final Rejection dated Jul. 26, 2017, all pages.

U.S. Appl. No. 15/178,108, filed Jun. 9, 2016 Notice of Allowance dated Nov. 9, 2017, all pages.

U.S. Appl. No. 14/570,037, filed Dec. 15, 2014 Non-Final Rejection dated Aug. 3, 2015, all pages.

U.S. Appl. No. 14/570,037, filed Dec. 15, 2014 Non-Final Rejection dated Dec. 2, 2015, all pages.

U.S. Appl. No. 14/570,037, filed Dec. 15, 2014 Notice of Allowance dated Mar. 2, 2016, all pages.

* cited by examiner

METHODS AND SYSTEMS FOR IMPROVING DISCLOSURE REQUIREMENT COMPLIANCE

CROSS-REFERENCES TO RELATED APPLICATIONS

This application is a continuation of U.S. patent application Ser. No. 15/178,108, filed Jun. 9, 2016, and entitled "Methods and Systems for Improving Disclosure Requirement Compliance," which is a continuation of U.S. patent application Ser. No. 14/570,037, filed Dec. 15, 2014, issued as U.S. Pat. No. 9,384,428 on Jul. 5, 2016, and entitled "Methods and Systems for Improving Disclosure Requirement Compliance," the entire disclosure of which is hereby incorporated by reference, for all purposes, as if fully set forth herein.

BACKGROUND OF THE INVENTION

Traditionally, printing an electronic document to a printer requires several steps from a user. For instance, to print a document, a user typically selects a print icon from a toolbar menu, views a print dialog box, and specifies various print options from the print dialog box. After entering or confirming the settings, the user typically clicks a print button to print to the specified printer. In the process, multiple clicks and selections are required, which may be cumbersome and time-consuming, particularly if the settings need to be re-selected each time a document is sent to a printer. Furthermore, an initiated print job may be canceled, interrupted, or otherwise unsuccessful, without any information of the status or failed print attempt being documented or reported out. This application is intended to address such issues and to provide related advantages.

BRIEF SUMMARY OF THE INVENTION

This invention generally relates to systems and methods for printing, and more specifically, to systems and methods for streamlining printing functions to improve disclosure requirement compliance.

In one aspect of the present disclosure, a method for bypassing a print dialog box that indicates a print confirmation, a prompt message, and/or a page preview, by employing a background print applet is provided. The method may include detecting, by the applet, a print content to be printed by a printer in operative communication with the applet. The method may further include identifying, by the applet, one or more features of the print content, and/or determining, by the applet, one or more print settings based on the identified one or more features. Further, the method may include, in response to determining the one or more print settings based on the identified one or more features, initiating, by the applet, the print content to be printed by the printer based on the determined print settings. Initiating the print content may comprise bypassing, by the applet, the print dialog box.

Various embodiments of the method may include one or more of the following features. Detecting the print content may comprise receiving, by the applet, a manual input to print the print content, and/or automatically detecting, by the applet, the print content as the print content is loaded or downloaded by a web browser. The method may include, after detecting the print content, encoding, by the applet, the print content to be printed by the printer. The background print applet may include a Java applet that launches automatically when a web browser providing the print content is open or opened. Initiating, by the applet, the print content to be printed may comprise bypassing at least one of an operating system print function and a web browser print function. The one or more features of the print content may be indicative of at least one of a username, a computer name, a uniform resource locator ("URL"), and a content type associated with the print content. The content type may comprise at least one of a receipt, a transaction receipt, a report, a check, and a predisclosure statement. The predisclosure statement may comprise an amount for a financial transaction, a fee for the financial transaction, a recipient, and a sender and/or comply with requirements of the Dodd-Frank Act.

The method may further include, after initiating the print content to be printed, receiving, by the applet, indication from the printer that the print content was successfully printed prior to completion of the financial transaction. The method may include instructing, by the applet, the printer to print the print content on tracking paper associated with a tracking label, a serial number, or other traceable identification. The method may further include, after initiating, by the applet, the print content to be printed, determining, by the applet, a task status of the print content. The task status may comprise at least one of a completed status and an error status. The method may include storing, by the applet, the determined task status of the print content in a print log and/or along with a timestamp of the printing as determined by the applet. The method may further include sending, by the applet, the determined task status of the print content to a remote host system through a communications network. Other features of the method may include determining, by the applet, the task status is the error status based on feedback received from the printer through a local communications network, and sending, by the applet through a communications network, the error status to a financial transaction host system to prevent completion of the financial transaction.

Still further, the method may include, in response to determining the error status, initiating, by the applet, the printer to retry printing the print content, determining, by the applet, an availability status of an additional printer for printing the print content, and/or after determining the availability status of the additional printer, initiating, by the applet, the additional printer to print the print content based on the determined print settings. The method may include determining, by the applet, an additional task status is a second error status based on feedback received from the additional printer, and after determining the additional task status is the second error status, communicating, by the applet, the error status and the second error status to the financial transaction host system to prevent completion of the financial transfer. The method may further include receiving, by the applet, a one-time initial setup prior to detecting the print content to be printed by the printer. The one-time initial setup may comprise receiving, by the applet, the one or more print settings from a user, receiving, by the applet, the one or more features of the print content from a user, associating, by the applet, the one or more print settings with the one or more features of the print content, and/or storing, by the applet, the associations in a look-up database that may be accessed, by the applet, when determining the one or more print settings based on the identified one or more features of the print content. The one or more print settings may include at least one of a pre-selected printer, a page setup setting, a print style setting, a paper size setting, a page range to be printed setting, a number of pages setting, a number of copies setting, a single-sided or duplex setting, and a color or black and white setting. Further, the one or more print settings may include a predetermined recipient for sending a task status of the print content upon initiating, by the applet, the print content to be printed.

In another aspect of the present disclosure, a system for bypassing a print dialog box by employing a background print applet is provided. The system may include one or more processors and a memory communicatively coupled with and readable by the one or more processors. The memory may have stored therein processor-readable instructions that, when executed by the one or more processors, cause the one or more processors to perform one or functions for bypassing the print dialog box. For instance, the processor-readable instructions may cause the one or more processors to detect, by the applet, a print content to be printed by a printer in operative communication with the applet, identify, by the applet, one or more features of the print content, and/or determine, by the applet, one or more print settings based on the identified one or more features. Further, the processor-readable instructions may include, in response to determining the one or more print settings based on the identified one or more features, initiate, by the applet, the print content to be printed by the printer based on the determined print settings. Initiating the print content may include bypassing, by the applet, the print dialog box. It is noted that various embodiments of the system may include one or more additional features as contemplated in this disclosure.

In yet another aspect of the present disclosure, a computer-readable medium having stored thereon a series of instructions which, when executed by a processor, cause the processor to bypass a print dialog box by employing a background print applet is provided. The series of instructions may include detecting, by the applet, a print content to be printed by a printer in operative communication with the applet, identifying, by the applet, one or more features of the print content, and/or determining, by the applet, one or more print settings based on the identified one or more features. The series of instructions may further include, in response to determining the one or more print settings based on the identified one or more features, initiating, by the applet, the print content to be printed by the printer based on the determined print settings, whereby initiating the print content may include bypassing, by the applet, the print dialog box. Various embodiments of the computer-readable medium may include one or more additional features as contemplated further in this disclosure.

Figure 1:
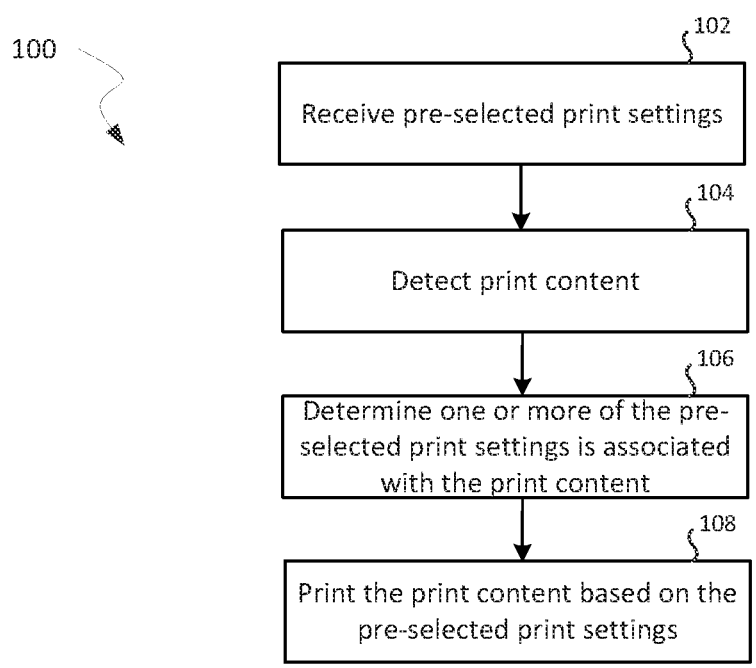
FIG. 1 shows a method for a background print applet that improves disclosure requirement compliance, according to various aspects of the present invention.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Further, specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In general, the present disclosure is directed to systems and methods for bypassing a print dialog box when a user chooses to print through a browser-based application and/or an internet/web browser application, such as, and not limited to, Mozilla Firefox, Internet Explorer, Google Chrome, Safari, Netscape Navigator, and other software applications that may retrieve, present, and/or traverse information resources, such as a web page, image, video, or other piece of content identified by a uniform resource identifier ("URI" or "URL"), on the World Wide Web. For instance, the print dialog boxes being bypassed herein may be a web browser dialog box and/or a Windows print dialog box, and may include a print confirmation, a prompt message, a page preview, and/or buttons that require additional clicks in order to print. In one example implementation, a Java-applet based print function facilitates the internet browser application to print directly to a printer without forcing the user to first view the print dialog box and/or click on a print button each time the user chooses to print. In another example, the systems and methods disclosed herein may allow a user to select a printer only once, so that the selected printer is automatically utilized each time the user chooses to print. It is worthy to note that the systems and methods disclosed herein may similarly facilitate printing functions in other types of software applications, and is not limited to web browsers. Such other software applications may include, but are not limited to, document and/or image generating or editing applications, document viewing and/or storing applications, and so forth.

In a further example, the present disclosure may facilitate users in certain browser applications, e.g. Mozilla Firefox browser, to configure different printers as default printers for different functions within the same browser application. For instance, the user may select different default printers for different types of print jobs or contents, such as different types of documents or transactions to be printed, without having to manually set the printer for printing each time. In yet another example, the systems and methods disclosed herein may provide increased insight as to whether a particular print job was successful, and/or if the user had clicked on a print or cancel button that may alter or otherwise interrupt printing.

Advantages of the present systems and methods noted above and further throughout the disclosure may include, among other benefits, faster transaction times, improved user interfaces that require less clicks to perform a print function, and improved visibility to the internet browser application and/or other systems regarding a print status. Such advantages may be beneficial in improving disclosure compliance across a variety of industries, including, merely way by of example, financial transaction industries. For instance, the systems and methods disclosed herein may aid in disclosing terms of a money transfer to a customer, to help determine that a receipt of the transfer was completed, and/or other requirements that may be stipulated by rules and regulations, such as the Dodd-Frank Act.

Turning now to FIG. 1, a block diagram shows a method 100 of one example for bypassing a print dialog box, such as a web browser print dialog box and/or a Windows print dialog box. Various or all portions of the method 100 may be implemented by one or more applets. In one example, the method 100 is provided for by a JavaScript or Java applet, which may be a background process or program running continuously and/or concurrently with a main program or process in a foreground of a session. For instance, the method 100 may be implemented while a user is utilizing other applications and/or internet browsers with little to no interference from the applet. In another example, the applet and/or any event of the method 100 may be stopped and/or selectively started by a user. It is noted that method 100, and any other methods described herein, may include additional steps, rearranged steps, and that any of the steps being shown may be optional.

As shown in FIG. 1, the method 100 may comprise receiving, by the applet, one or more pre-selected print settings (step 102). The one or more pre-selected print settings may be received, for instance, during a one-time initial setup of the applet and/or a one-time setup for a particular type of print job, such as printing a receipt from a browser, or a particular receipt from a particular browser. Merely by way of example, the one-time initial setup may include receiving, by the applet, the one or more print settings from a user via a user interface, such as a webpage and/or browser window. The one-time initial setup may further comprise receiving, by the applet, one or more features pertaining to the particular type of print job, such as one or more features of print content to be printed. The one-time initial setup may further include storing, by the applet, associations in a look-up database that is accessible by the applet for determining when to implement various pre-selected settings. In a different aspects, one or more pre-selected print settings may be pre-programmed into the applet such that user selection is not required.

It is contemplated that the pre-selected print settings received during the one-time setup may be stored and later implemented automatically, as needed, by the applet to bypass any print-related prompts that would require further input from a user during a particular print-type event. For instance, the pre-selected print settings may contain necessary print settings that can complete a print job and allow for a Windows dialog box and/or a browser dialog box to be dismissed or skipped, automatically, without popping up on a display screen or other user-directed intervention, when printing a certain type of receipt. Various examples of print settings may be provided, such as, and not limited to, a pre-selected printer, a page setup setting, a print style setting, a paper size setting, a page range to be printed setting, a number of pages setting, a number of copies setting, a single-sided or duplex setting, and a color or black and white setting. In other aspects, the print settings may include further instruction and/or data, such as a recipient address for sending a task status report of the print content or print job. For instance, a user may specify via a user interface a predetermined recipient to receive an update, status or completion report of the print job after the printing is initiated. In another example, determining a pre-selected printer may further require gaining permission, by the applet, to use an installed printer. Such permissions may be made by digital signature prompts. Other example are possible.

As further shown in FIG. 1, the method 100 may include detecting, by the applet, the print content to be printed (step 104). In some examples, the applet may detect the print content upon receiving a manual input from a user to print the print content, which may be any or all presently-displayed text and/or graphics on a display screen. The manual input may include clicking a print icon on a browser or application, such as a print icon on a task bar of a browser providing the print content. In another example, the applet may detect the print content automatically as the print content is being downloaded, loaded, and/or otherwise displayed on a display screen by a browser and/or application.

It is contemplated that a user may specify during the one-time initial setup whether or when print content should be automatically or manually detected. For instance, detection of the print content may vary based on a particular user login, session, webpage, and/or time of day. In another example, the applet may detect content not be printed, such as advertisements, certain texts or images, text and/or images related to other genre not pertinent to the particular type of print job, and others. In another aspect, the applet may detect different types of print jobs, concurrently, and execute printing of all of the detect print jobs containing the detected, varying print content. Merely by way of example, a webpage may include a receipt to be printed via a receipt printer and a report to be printed via another printer on color paper. The applet may detect, prepare and/or execute both print jobs simultaneously and/or about at the same time.

Still in reference to FIG. 1, the method 100 may comprise determining, by the applet, that one or more of the pre-selected print settings is associated with the print content (106). By way of example, as described above, the applet may determine based on the look-up database that various features identified in the print content may include associated print settings. Such print settings may be any of the print settings described previously, including, and not limited to, a pre-selected printer, a page setup setting, a print style setting, a paper size setting, a page range to be printed setting, a number of pages setting, a number of copies setting, a single-sided or duplex setting, and a color or black and white setting. Such features recognized by the applet may include, and not be limited to, information indicative of a username, a computer name, a URL, and/or a content type or category of the print content. Such content types or categories may include, and not be limited to, receipts, transaction receipts, reports, checks, predisclosure statements, tickets, different types of forms, mathematical equations, programming languages, and so on.

It is contemplated that the features may be any features that can be selected by a user via a user interface that interacts with the applet, entered by the user, and/or pre-programmed into the applet. For instance, the applet may be directed to identifying and printing financial subject matter, and thereby detect various features, terminology and data types related to financial matters. It is contemplated that the applet may be customized in this manner, and/or user-customized, to accommodate a wide variety of industries and applications. In still other examples, a default printer of the windows dialog box may change depending on which application or browser is used.

Referring again to FIG. 1, the method 100 may further comprise printing the print content based on the pre-selected print settings (108). For instance, the applet may print to a particular printer of a plurality of available printers. The particular printer may be selected based on a particular application being used and/or open in the browser. The particular printer may be a special printer containing receipt-size paper for printing the receipt. The pre-selected print settings may include instructing, by the applet, the printer to print on a tracking paper having an associated tracking label, a serial number, and/or other traceable identification. In other examples, the particular printer may be a color printer and/or be a printer in closest proximity to a certain user, or otherwise location-specific.

In some aspects, printing the print content includes encoding, by the applet, the print content prior to spooling or otherwise sending the encoded print content to the appropriate printer. In other aspects, printing the print content includes decoding, by the applet, the print content which may have been encoded by the application and/or browser, or other entity. In another example, the print content may be encoded, by the applet, to include appropriate instructions for a particular printer or other device, whereby the encoded instructions may contain the determined pre-selected print settings that are applicable for the print job. In yet another example, the print content may be decoded by the applet upon detecting the print content to identify various or further print settings and/or instructions to be carried through by the applet. For instance, such decoded settings and/or instructions may include any of the print settings listed above, recipients to be notified, queries and/or messages for certain printers, and the like.

Referring yet again to FIG. 1, it is contemplated that other steps may be included in the method 100. Merely by way of example, the applet may be launched automatically when a web browser providing the print content is opened on a display screen. Initiating the print content to be printed may further comprise bypassing at least one of an operating system print function and/or a web browser print function. As described in further detail below, the applet may receive indication from the employed printer that the print content was successfully, or not successfully, printed, and further send such completed or error status information out for reporting. For instance, the applet may send the determined task status of the print content to a remote host system through a mobile or internet communications network. Such task statuses may further be stored by the applet in a database that includes a log having a timestamp of the print job, a description of success or errors, a tracking label number, and/or other details, which may be customized by the user.

Figure 2:
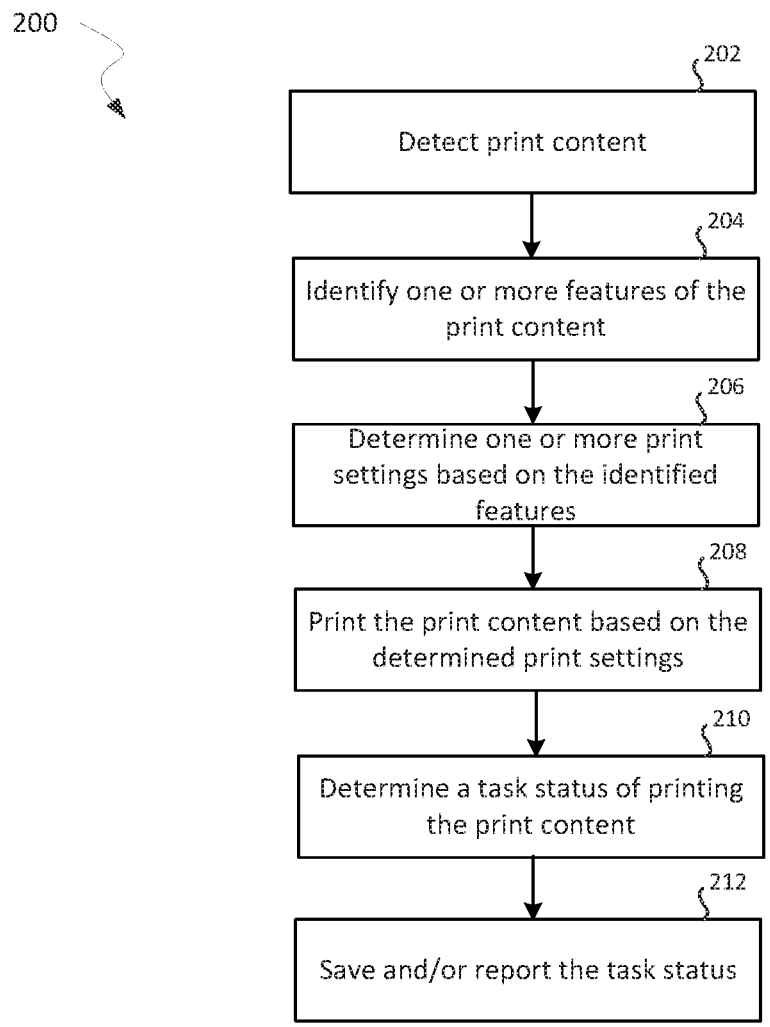
FIG. 2 shows another method for a background print applet that improves disclosure requirement compliance, according to various aspects of the present invention.

Turning now to FIG. 2, another method 200 that may be implemented by a print function applet is described. It is noted that method 200, and any other methods described herein, may include additional steps, rearranged steps, and that any of the steps being shown may be optional. The method 200 may include detecting a print content to be printed (step 202). In some aspects, detecting the print content may include detecting a print job that was manually activated by a user and/or detecting a print content based on completion of a process or transaction in a browser. For instance, and merely by way of example, the method 200 may detect that a form has been completed and determine that the completed form is the print content that should be printed.

The method 200 may further include identifying one or more features of the detected print content (step 204). Merely by way of example, the print content may be a report, check, and/or receipt for a financial transaction. As described previously, the print content may be a predisclosure statement ("PDS") having various fields, such as, and merely by way of example, a financial transaction amount, sender and recipient information, transaction fee, and/or other details as required by a financial instruction and/or Dodd-Frank regulations.

The method 200 may further include determining one or more settings based on the identified features (step 206). For instance, the one or more print settings may include determining a pre-selected printer for printing the print content, whereby the pre-selected printer is selected only one time by the user during a one-time initial setup procedure. In some aspects, pre-selected printers may be act as default printers when different types of transactions in a browser application are identified by the applet. For instance, for printing content type that includes a check, the applet may assign a printer having check-size paper as a default printer for the browser application. In this way, it is contemplated that the applet may eliminate the need for a user to re-select a printer, and/or other print settings, for accommodating different types of print jobs, by automatically re-selecting the printer and/or print settings itself. In another example, a user may use a mouse cursor to highlight or otherwise indicate a specific portion of a webpage to be printed, the applet may determine one or more features of that highlighted portion, determine and apply one or more settings associated with that portion, and print that portion based on the settings.

At step 208, the method 200 may comprise printing the print content based on the predetermined print settings. It is contemplated that after hitting a print button by the user and/or otherwise determining a print content to be printed, which may occur during or before step 202, no print dialog box requiring further user input or having further buttons are provided. The method 200 permits customized printing without having to select a printer and/or customizations each time a print job is desired. It is contemplated the method 200 may ignore or otherwise override any preset or system default printers, such as those implemented by a Windows operating system and/or an internet browser or application. In this way, the applet may skip any browser, operating system, and/or machine code requirements to initiate and/or complete a print job.

The method 200 may further comprise determining a task status of printing the print content (step 210). The task status may indicate for a given print job or attempt whether the printing was in progress, completed, stopped, and/or otherwise unsuccessfully completed. It is contemplated that the printer may automatically send status information to the applet through a communication network, such as a local communications network if the printer is located locally. In another aspect, the applet may query the printer for an updated status, for instance, during and/or shortly after the printing. In still another aspect, the applet may determine that the task status is an error status based on the feedback received from the printer. In that case, various events may be triggered by the applet. The print job may be canceled, the applet may send the error status to a user system and/or a host system, such as a financial transaction host system to prevent completion of a financial transfer, and/or the applet may retry printing the print content under the same pre-selected print settings or using different parameters. For instance, the applet may retry printing the print content automatically and/or query the user via a user interface whether to retry printing with different parameters. Merely by way of example, the applet may suggest different parameters based on an evaluation of the error. Such different parameters may include a different size paper, different printer, and so on.

In some cases, the applet may retry printing and determine that no print attempts were successful prior to determining an error status. In further aspects, the applet may determine other print settings and/or other printers to attempt in the event of an error and implement them automatically. For instance, the applet may determine an availability status, such as a busy, on, off, and/or available status, of an additional printer and initiating the additional printer to print the print content based on one or more of the pre-determined print settings. The applet may determine which additional printers to consider based on their similarity with the pre-selected printer, such as an available paper size and/or location of the printer, and/or which predetermined print settings must be altered to print successfully at the additional printer, and/or the pre selected printer. In a further aspect, the applet may determine an additional task status based on feedback from the additional printer. In some cases, the applet may receive an additional error status based on the secondary attempt(s) and communicate the error status, for instance to a financial transaction host system to prevent completion of the financial transfer. Other embodiments are possible.

Further, the method 200 may save the task status along with other details in a print log report, which may provide a list of all print jobs and attempts made in a given day or time period. In some aspects, the method 200 saves and/or automatically reports the task status (step 212). In other aspects, the log report is pulled or otherwise retrieved by a host system. Such logs may include various fields that are detected by the applet and/or sent by the printer to the applet. The fields may include a print job number, a time and date of the print request, a content type printed, a purpose for printing the content, a customer name or identification, a reference number, a printer identification, a username, a printer location, and/or a description of the content type, such as values of any or all features that were identified in the print content by the applet during the method 200. Further, the task status(es) and a reporting status, such as an entity name and/or location that receives the status reports and/or otherwise accesses the log, may be included in the log report. In another aspect, the report may include any further, user-customizable fields that may be retrieved and/or automatically filled in by the applet based on the print job.

Figure 3:
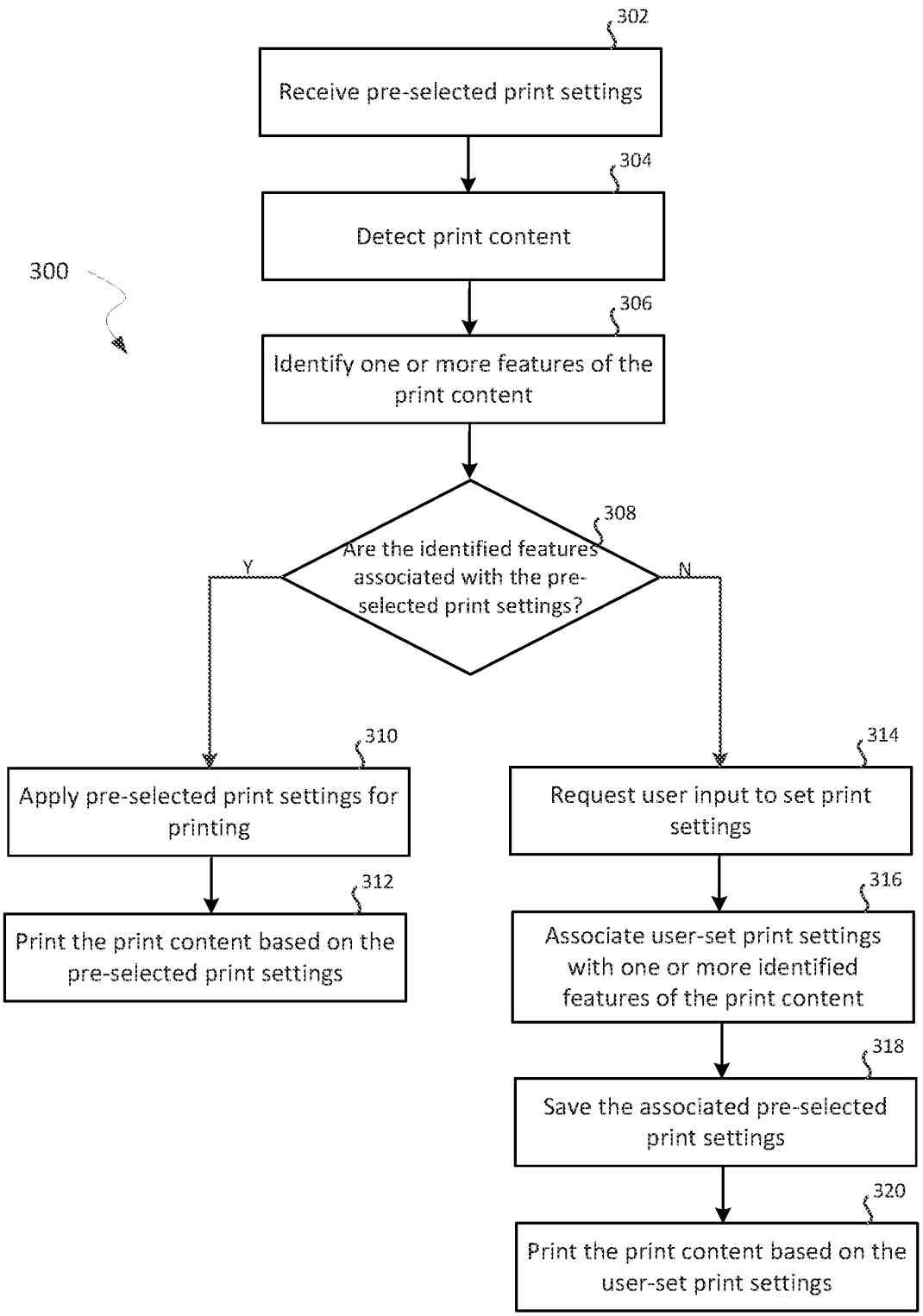
FIG. 3 shows yet another method for a background print applet that improves disclosure requirement compliance, according to various aspects of the present invention.

Turning now to FIG. 3, yet another example method 300 for a print function applet is shown. It is noted that method 300, and any other methods described herein, may include additional steps, rearranged steps, and that any of the steps being shown may be optional. Further, it is contemplated that any methods disclosed herein may be combined together in any manner. As shown in FIG. 3, the method 300 may include receiving pre-selected print settings 302 as described previously. For instance, one or more of the pre-selected print settings may be received during a one-time initial setup for a particular print job type and/or the applet itself. Further, one or more of the pre-selected print settings may be originally included, such as pre-coded into, the applet itself. It is contemplated that step 302, or any of the steps shown herein, may be optional, for instance if the pre-selected print settings are already in or accessible to the applet.

The method 300 may further include detecting print content (step 304), such as by periodically checking for print content when a user is logged in to a browser, application, and/or otherwise when a user is logged into the applet, or has activated the applet. In an active mode, the applet may scan for print content in a webpage in time intervals, every time a URL in the browser changes, and/or every time a webpage content changes. Other examples are possible. Upon detecting the print content, the method 300 may include identifying, by the applet, one or more features of the print content (step 306). In some aspects, as described above, the applet determines at step 308 that the identified features correspond to one or more pre-selected print settings. In that case, the applet may apply the pre-selected print settings for printing (step 310) and print the print content based on the pre-selected print settings (step 312).

In other cases, at step 308, the applet may determine that identified features of the print content are not associated with any pre-selected print settings. In that case, the applet may determine that no features are recognized or found in the print content, or that the print content contains identified features which do not have associated pre-selected settings yet. For example, for a group of print settings to be applied, the applet may need to identify three specific features in the print content. In some cases, only two of those features may be identified, in which case the applet may either determine that the print content does not fall under that particular content type associated with the group of print settings. In that case, the applet may request user input to set the print settings (step 314). For instance, the applet may query the user to identify which features of the print content should be recognized and/or which print settings to associate with such features. In other examples, the applet may seek user confirmation to confirm a content type of the print content, for instance when not all of the identified features match features in a database. Such user confirmations and settings may be associated with the identified features (step 316) and may be stored in the database (step 318) so that future combinations of such features may be printed along with the settings automatically. The method 300 may further print the print content based on the user-set print settings (step 320).

Figure 4:
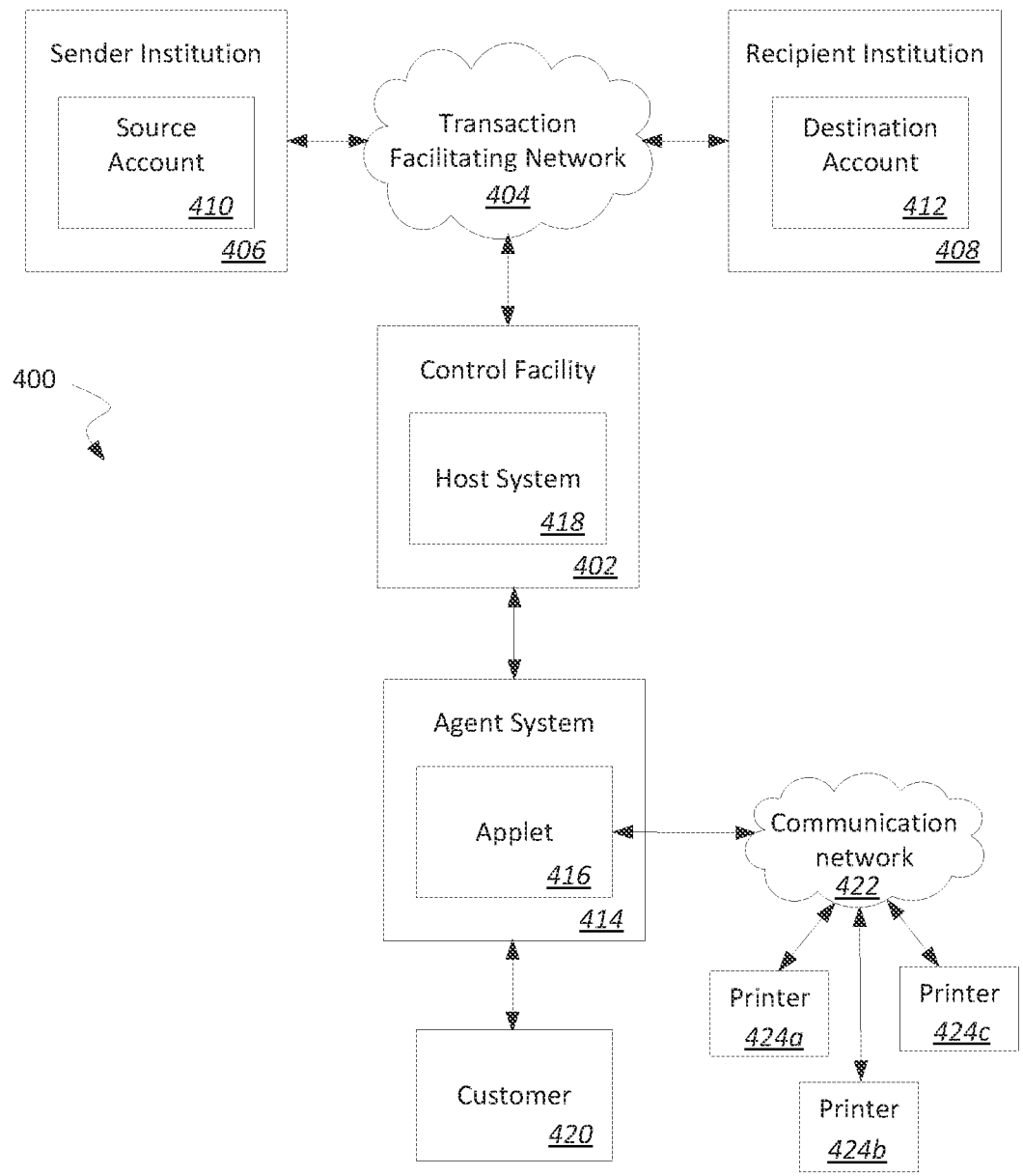
FIG. 4 shows an example implementation of a method and system for a background print applet that improves disclosure requirement compliance, according to various aspects of the present invention.

Turning now to FIG. 4, a block diagram showing an example system in which the above methods may be implemented is provided. The system 400 may be utilized for making financial transfers between a sender and recipient via various communication networks, such as a mobile communication network, interne network, and/or local area networks. It is contemplated that the system 400 may include additional components not shown, and that any of the components may be in communication or otherwise linked with one another.

As illustrated in FIG. 4, the system 400 may include a control facility 402, e.g. a money transfer provider system such as Western Union or another money transfer provider service. The control facility 402 may be communicatively coupled with a transaction facilitating network 404, e.g. a financial transfer network. The transaction facilitating network 404 may further be in communication with a sender institution 406 and a recipient institution 408, which may be account providers that maintain, control, or otherwise manipulate source and destination accounts 410, 412, respectively. The source account 410 may include any of a variety of accounts, such as a traditional bank account, in which sender institution 406 can be a financial institution. According to other embodiments, the source account 410 can be a virtual (or e-money) wallet, in which case the sender institution 406 can be a mobile operator or agent. Similarly, the destination account 412 can be any of a variety of accounts, such as a bank or virtual (e-money) account, and the recipient institution 408 can be a financial institution, mobile operator, or agent. Generally speaking and as understood by one skilled in the art, the control facility can access a source account 410 of one sender institution 406 and/or a destination account 412 of the same or a different recipient institution 408 to affect a monetary transfer from and/or to the accounts 410, 412 via the transaction facilitating network 404.

The control facility 402 can also be adapted to identify the entities and/or accounts associated with a transaction and/or determine a destination for a payment of the transaction. For example, the entities and/or accounts can be identified based on data maintained in a verification database or other repository, which can be maintained internally or externally to the control facility 402.

The system 400 may further include an agent system 414, which may belong to or otherwise be associated with the control facility 402. The agent 414 may comprise an individual, group, retail location, or other entity having an applet 416, such as the print applet described herein. The print applet 416 may communicate with a host system 418 of the control facility 402. In some embodiments, it is contemplated that the agent system 414 may be located remotely or in a different geographic region from the control facility 402. Generally speaking, the agent 414 may facilitate customers to access the services of the control facility 402, such as the money transfer services. A customer 420, e.g. sender, may initiate a transaction to transfer money to a recipient. It is contemplated that any communicative links shown herein may include communication networks, conduits, and/or interfaces. For instance, communication may be provided via fiber-optic, coaxial cable, and/or other hard-wired means.

As further shown in FIG. 4, the applet 416 may be linked to a communication network 422 that is further connected with one or more printers 424a-c. In some examples, the communication network 422 and printers 424a-c may be included in the agent system 414 and the communication network 422 may represent be a local area network. Other embodiments are possible. It is contemplated that the applet 416 may interact with an operator at the agent system 414 to print various content types through the printers 424a-c without having to view additional print dialog boxes. Further, the applet 416 may be utilized as described above to confirm if the operator has successfully printed the print content. For instance, the applet 416 may transmit a task status for printing a receipt to the host system 418 prior to a financial transfer being made. In this way, the host system 418 may have greater visibility of printing events at the agent system 414, which may be beneficial for ensuring that disclosure requirements are being met for various financial transactions. Merely by way of example, the applet 416 may notify the host system 418 that an error occurred in printing a predisclosure statement and that a financial transaction should be withheld and/or canceled, until a successfully completed printout is available to the customer 420. Other embodiments are possible.

Figure 5:
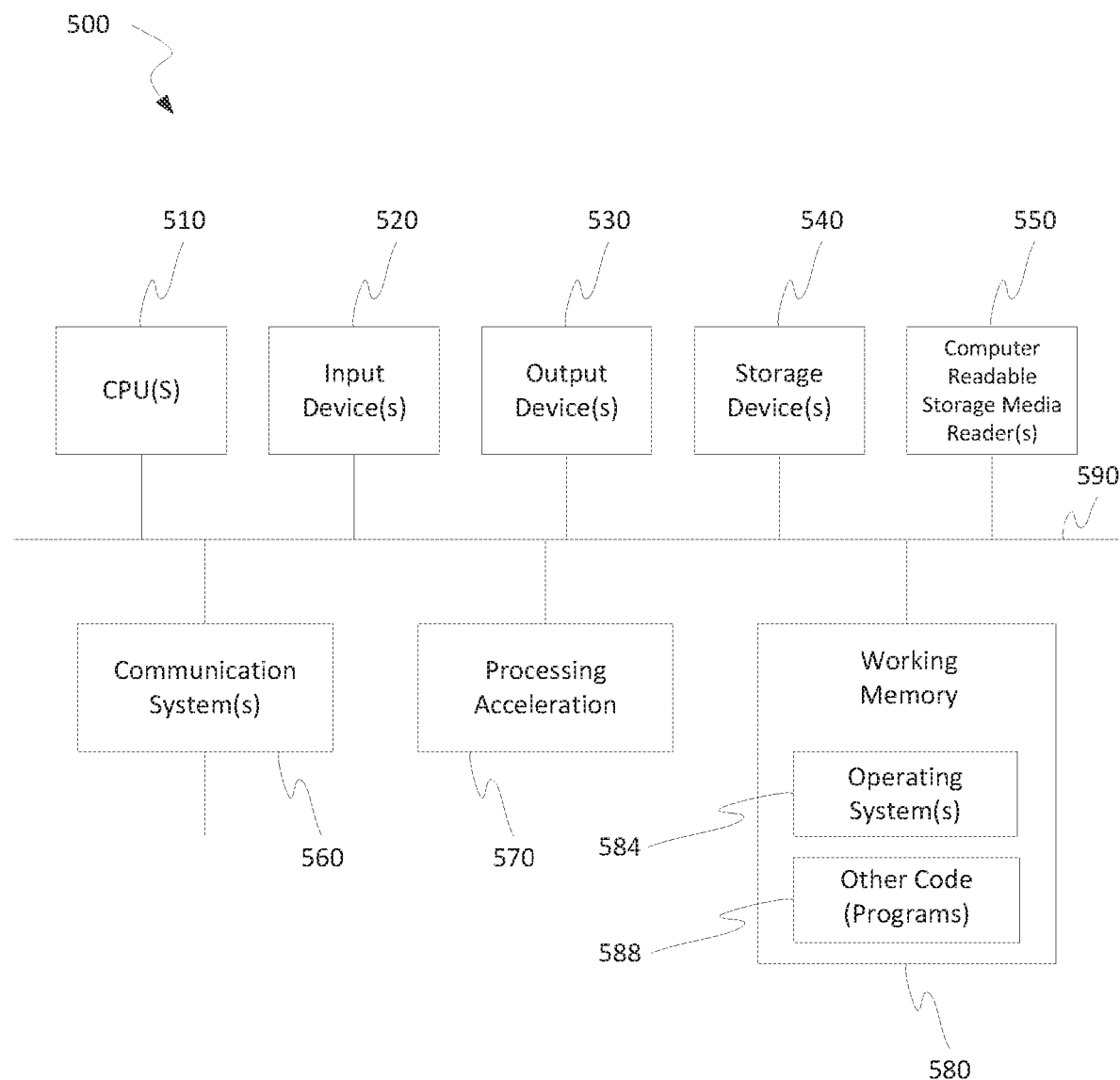
FIG. 5 shows an example computer architecture upon which various aspects of the present invention may be implemented.

Turning now to FIG. 5, a block diagram is shown illustrating a computer system upon which embodiments of the present invention may be implemented. This example illustrates a computer system 500 such as may be used, in whole, in part, or with various modifications, to provide the functions of the control facility 402, agent system 414, applet 416, host system 418, and/or other components of the invention such as those discussed in FIGS. 1-4.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software, stored on and/or executed by a computer system such as system 500, can provide the functions of any of the print function applet, and/or other components of the invention such as those discussed above.

It is contemplated that the systems and methods disclosed herein may allow a user to select a printer one time for a particular type of print job, and then have the printer automatically used each time the user chooses to print similar types of print jobs, without having the print dialog box displayed each time. In a further aspect, the systems and methods disclosed herein may allow a user to link any printing option to a print content to have the printer automatically use the printing option each time the user chooses to print similar or related print content. In this way, in some interne browsers, a user may select default printers for different transactions using the applet disclosed herein. Furthermore, a direct status of the printer may be obtained by the applet for disclosure and record-keeping purposes. In these ways, it is contemplated that the systems and methods disclosed herein provide for faster transaction times, an improved user interface requiring less clicks from the user, and provide for visibility to the applet and any connected systems regarding print status. Other examples and benefits are possible.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
    detecting, by a computer system, using a background application executing on the computer system, an initiation of a first printing operation by a main application to print a first document via a printer device, wherein the main application is configured to display one or more subsequent print-related user interfaces in response to the initiation of the first printing operation;
    determining, by the background application executing on the computer system, a first transaction type associated with the first print operation;
    determining, by the background application executing on the computer system, whether or not to bypass the subsequent print-related user interfaces that the main application is configured to display, based on the determined first transaction type associated with the first print operation;
    in response to determining that the subsequent print-related user interfaces are to be bypassed based on the first transaction type, initiating, by the background application executing on the computer system, the printing of the first document via the printer device, wherein initiating the printing comprises bypassing the subsequent print-related user interfaces that the main application is configured to display, such that the print-related user interfaces are not displayed by the main application during the first printing operation;
    detecting, by the background application executing on the computer system, an initiation of a second printing operation by the main application to print a second document via the printer device, wherein the main application is configured to display one or more subsequent print-related user interfaces in response to the initiation of the second printing operation;
    determining, by the background application executing on the computer system, a second transaction type associated with the second print operation, wherein the second transaction type is different from the first transaction type;
    determining, by the background application executing on the computer system, whether or not to bypass the subsequent print-related user interfaces that the main application is configured to display, based on the determined second transaction type associated with the second print operation; and
    in response to determining that the subsequent print-related user interfaces are not to be bypassed based on the second transaction type, initiating, by the background application executing on the computer system, the printing of the second document via the printer device, wherein initiating the printing comprises permitting the subsequent print-related user interfaces to be displayed via the main application during the first printing operation.

2. The method of claim 1, wherein the main application is a browser application, and wherein the background application is configured to execute as a background process concurrently when the browser application is executing in the foreground of a computing session on the computer system.

3. The method of claim 2, wherein the background application is a Java applet that launches automatically in response to the browser application being opened.

4. The method of claim 1, wherein bypassing the subsequent print-related user interfaces that the main application is configured to display comprises bypassing, by the background application, one or more of: a web browser print dialog box, a Windows print dialog box, a print preview page dialog box, or a print settings dialog box.

5. The method of claim 1, wherein bypassing the subsequent print-related user interfaces that the main application is configured to display comprises bypassing, by the background application, a print dialog box that allows a user to cancel the first print operation.

6. The method of claim 1, further comprising:
after initiating the printing of the first print operation, determining, using the background application, a task status of the first printing operation based on feedback received from the printer device through a local communications network.

7. The method of claim 6, further comprising:
transmitting, by the background application, the determined task status of the first printing operation to a remote host system through a wide-area communications network separate from the local communications network.

8. A computer system, comprising:
one or more processors; and
a memory communicatively coupled with and readable by the one or more processors and having stored therein processor-readable instructions that, when executed by the one or more processors, cause the one or more processors to:
  detect, using a background application executing on the computer system, an initiation of a first printing operation by a main application to print a first document via a printer device, wherein the main application is configured to display one or more subsequent print-related user interfaces in response to the initiation of the first printing operation;
  determine, by the background application executing on the computer system, a first transaction type associated with the first print operation;
  determine, by the background application executing on the computer system, whether or not to bypass the subsequent print-related user interfaces that the main application is configured to display, based on the determined first transaction type associated with the first print operation;
  in response to determining that the subsequent print-related user interfaces are to be bypassed based on the first transaction type, initiate, by the background application executing on the computer system, the printing of the first document via the printer device, wherein initiating the printing comprises bypassing the subsequent print-related user interfaces that the main application is configured to display, such that the print-related user interfaces are not displayed by the main application during the first printing operation;
  detect, by the background application executing on the computer system, an initiation of a second printing operation by the main application to print a second document via the printer device, wherein the main application is configured to display one or more subsequent print-related user interfaces in response to the initiation of the second printing operation;
  determine, by the background application executing on the computer system, a second transaction type associated with the second print operation, wherein the second transaction type is different from the first transaction type;
  determine, by the background application executing on the computer system, whether or not to bypass the subsequent print-related user interfaces that the main application is configured to display, based on the determined second transaction type associated with the second print operation; and
  in response to determining that the subsequent print-related user interfaces are not to be bypassed based on the second transaction type, initiate, by the background application executing on the computer system, the printing of the second document via the printer device, wherein initiating the printing comprises permitting the subsequent print-related user interfaces to be displayed via the main application during the first printing operation.

9. The computer system of claim 8, wherein the main application is a browser application, and wherein the background application is configured to execute as a background process concurrently when the browser application is executing in the foreground of a computing session on the computer system.

10. The computer system of claim 9, wherein the background application is a Java applet that launches automatically in response to the browser application being opened.

11. The computer system of claim 8, wherein bypassing the subsequent print-related user interfaces that the main application is configured to display comprises bypassing, by the background application, one or more of: a web browser print dialog box, a Windows print dialog box, a print preview page dialog box, or a print settings dialog box.

12. The computer system of claim 8, wherein bypassing the subsequent print-related user interfaces that the main application is configured to display comprises bypassing, by the background application, a print dialog box that allows a user to cancel the first print operation.

13. The computer system of claim 8, the memory having stored therein further processor-readable instructions that, when executed by the one or more processors, cause the one or more processors to:
after initiating the printing of the first print operation, determine, using the background application, a task status of the first printing operation based on feedback received from the printer device through a local communications network.

14. The computer system of claim 13, the memory having stored therein further processor-readable instructions that, when executed by the one or more processors, cause the one or more processors to:
transmit, by the background application, the determined task status of the first printing operation to a remote host system through a wide-area communications network separate from the local communications network.

15. A non-transitory computer-readable medium having stored thereon a series of instructions which, when executed by a processor, cause the processor to initiate the execution of a background application configured to:
- detect, using a background application, an initiation of a first printing operation by a main application to print a first document via a printer device, wherein the main application is configured to display one or more subsequent print-related user interfaces in response to the initiation of the first printing operation;
- determine, by the background application, a first transaction type associated with the first print operation;
- determine, by the background application, whether or not to bypass the subsequent print-related user interfaces that the main application is configured to display, based on the determined first transaction type associated with the first print operation;
- in response to determining that the subsequent print-related user interfaces are to be bypassed based on the first transaction type, initiate, by the background application, the printing of the first document via the printer device, wherein initiating the printing comprises bypassing the subsequent print-related user interfaces that the main application is configured to display, such that the print-related user interfaces are not displayed by the main application during the first printing operation;
- detect, by the background application, an initiation of a second printing operation by the main application to print a second document via the printer device, wherein the main application is configured to display one or more subsequent print-related user interfaces in response to the initiation of the second printing operation;
- determine, by the background application, a second transaction type associated with the second print operation, wherein the second transaction type is different from the first transaction type;
- determine, by the background application, whether or not to bypass the subsequent print-related user interfaces that the main application is configured to display, based on the determined second transaction type associated with the second print operation; and
- in response to determining that the subsequent print-related user interfaces are not to be bypassed based on the second transaction type, initiate, by the background application, the printing of the second document via the printer device, wherein initiating the printing comprises permitting the subsequent print-related user interfaces to be displayed via the main application during the first printing operation.

16. The non-transitory computer-readable medium of claim 15, wherein the main application is a browser application, and wherein the background application is configured to execute as a background process concurrently when the browser application is executing in the foreground of a computing session.

17. The non-transitory computer-readable medium of claim 16, wherein the background application is a Java applet that launches automatically in response to the browser application being opened.

18. The non-transitory computer-readable medium of claim 15, wherein bypassing the subsequent print-related user interfaces that the main application is configured to display comprises bypassing, by the background application, one or more of: a web browser print dialog box, a Windows print dialog box, a print preview page dialog box, or a print settings dialog box.

19. The non-transitory computer-readable medium of claim 15, wherein bypassing the subsequent print-related user interfaces that the main application is configured to display comprises bypassing, by the background application, a print dialog box that allows a user to cancel the first print operation.

20. The non-transitory computer-readable medium of claim 15, having stored thereon further instructions which, when executed by a processor, cause the processor to:
- after initiating the printing of the first print operation, determine, using the background application, a task status of the first printing operation based on feedback received from the printer device through a local communications network; and
- transmit, by the background application, the determined task status of the first printing operation to a remote host system through a wide-area communications network separate from the local communications network.

* * * * *